United States Patent
Gilson et al.

(10) Patent No.: US 12,003,395 B2
(45) Date of Patent: Jun. 4, 2024

(54) PRIORITIZED MESSAGE ROUTING

(71) Applicant: Comcast Cable Communications, LLC, Philadelphia, PA (US)

(72) Inventors: Ross Gilson, Philadelphia, PA (US); John Jason Brzozowski, Schwenksville, PA (US); Brett Dietsch, Philadelphia, PA (US); Jessica Phillips, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/151,240

(22) Filed: Jan. 6, 2023

(65) Prior Publication Data

US 2023/0353468 A1 Nov. 2, 2023

Related U.S. Application Data

(63) Continuation of application No. 17/387,623, filed on Jul. 28, 2021, now Pat. No. 11,582,124, which is a continuation of application No. 16/165,733, filed on Oct. 19, 2018, now Pat. No. 11,108,664.

(51) Int. Cl.
| | |
|---|---|
| *H04L 43/0829* | (2022.01) |
| *H04L 12/66* | (2006.01) |
| *H04L 43/0876* | (2022.01) |
| *H04L 43/16* | (2022.01) |
| *H04L 47/24* | (2022.01) |
| *H04L 47/32* | (2022.01) |

(52) U.S. Cl.
CPC .......... *H04L 43/0829* (2013.01); *H04L 12/66* (2013.01); *H04L 43/0876* (2013.01); *H04L 43/16* (2013.01); *H04L 47/24* (2013.01); *H04L 47/323* (2013.01)

(58) Field of Classification Search
CPC . H04L 43/0829; H04L 43/0876; H04L 43/16; H04L 43/0847; H04L 12/66; H04L 47/24; H04L 47/323
USPC ......................................................... 370/252
See application file for complete search history.

(56) References Cited

U.S. PATENT DOCUMENTS

| | | | |
|---|---|---|---|
| 7,571,343 B1 * | 8/2009 | Xiang | ................. H04L 63/0272 714/2 |
| 9,473,323 B2 | 10/2016 | Emerson et al. | |
| 10,015,735 B1 | 7/2018 | Byrne | |
| 2013/0322251 A1 | 12/2013 | Kotecha et al. | |
| 2014/0269704 A1 | 9/2014 | Alexander et al. | |
| 2020/0100269 A1 | 3/2020 | Gulbay et al. | |
| 2020/0228422 A1 | 7/2020 | Chong et al. | |

FOREIGN PATENT DOCUMENTS

CN           103124240 A     5/2013

* cited by examiner

*Primary Examiner* — Intekhaab A Siddiquee
(74) *Attorney, Agent, or Firm* — Banner & Witcoff, Ltd.

(57) ABSTRACT

Systems, apparatuses, and methods are described for routing messages in a network. Gateways may be selectively chosen to forward messages from a user device to a network server. Gateways may forward messages based on forwarding priorities for the user device. The forwarding priorities may, for example, indicate a repeat count threshold for a quantity of times the gateway may receive a message from a particular user device before the gateway forwards the message.

20 Claims, 6 Drawing Sheets

PRIORITIZED MESSAGE ROUTING

CROSS-REFERENCE TO RELATED APPLICATIONS

This application is a continuation of U.S. patent application Ser. No. 17/387,623, filed Jul. 28, 2021, which is a continuation of U.S. application Ser. No. 16/165,733, filed Oct. 19, 2018 (now U.S. Pat. No. 11,108,664), each of which is hereby incorporated by reference in its entirety.

BACKGROUND

In some wireless networks having multiple gateways, the gateways may be configured to receive messages from user devices and forward them to a network server. Such a configuration may be useful as more and more devices use wireless communications, but in configurations in which every gateway forwards every message that it receives from the devices, this can result in redundant messaging and wasted energy. These and other shortcomings are addressed by the disclosure.

SUMMARY

The following summary presents a simplified summary of certain features. The summary is not an extensive overview and is not intended to identify key or critical elements.

Systems, apparatuses, and methods are described for routing messages in a network. A gateway may forward messages received from a user device based on the gateway's forwarding priority for the user device. The forwarding priority may, for example, comprise a repeat count threshold for a quantity of times the gateway may receive a message from the user device before the gateway forwards the message. The gateway's forwarding priority for the user device may be determined based on various factors, such as the gateway's backhaul link condition, the user device's condition, the locations of the gateway and the user device, etc. The forwarding priority may be adjusted by the gateway or by the network server. If multiple gateways forwarded messages from a user device, a subset of the gateways may be selectively chosen, based on various factors, for forwarding messages from the user device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
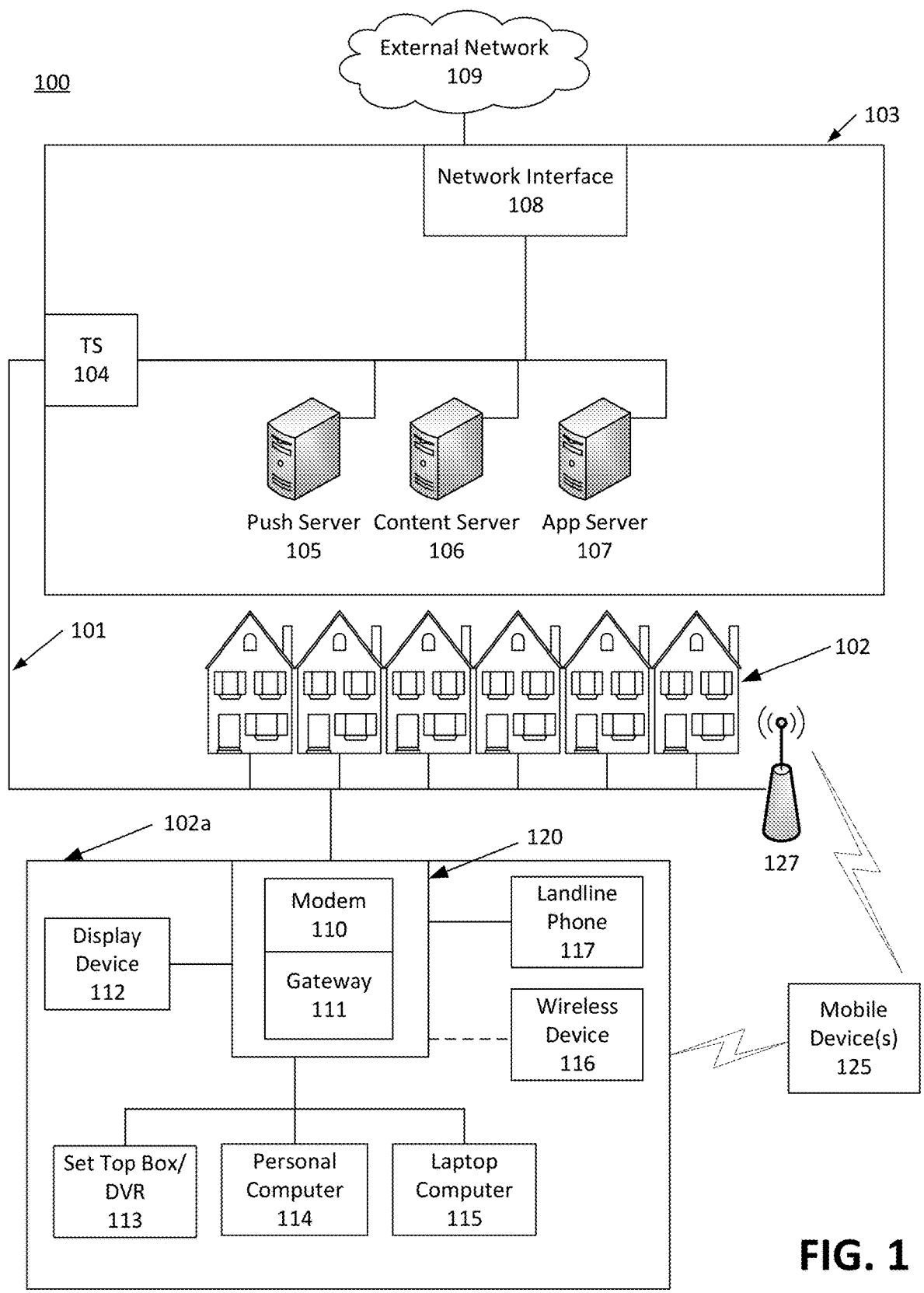
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

Communication links 101 may originate from the local office 103 and may be split to exchange information signals with the various premises 102. The communication links 101 may include components not illustrated, such as splitters, filters, amplifiers, etc., to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including additional push, content, and/or application servers, and/or other types of servers. Although shown separately, the push server 105, the content server 106, the application server 107, and/or other server(s) may be combined. The servers 105, 106, 107, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

Figure 2:
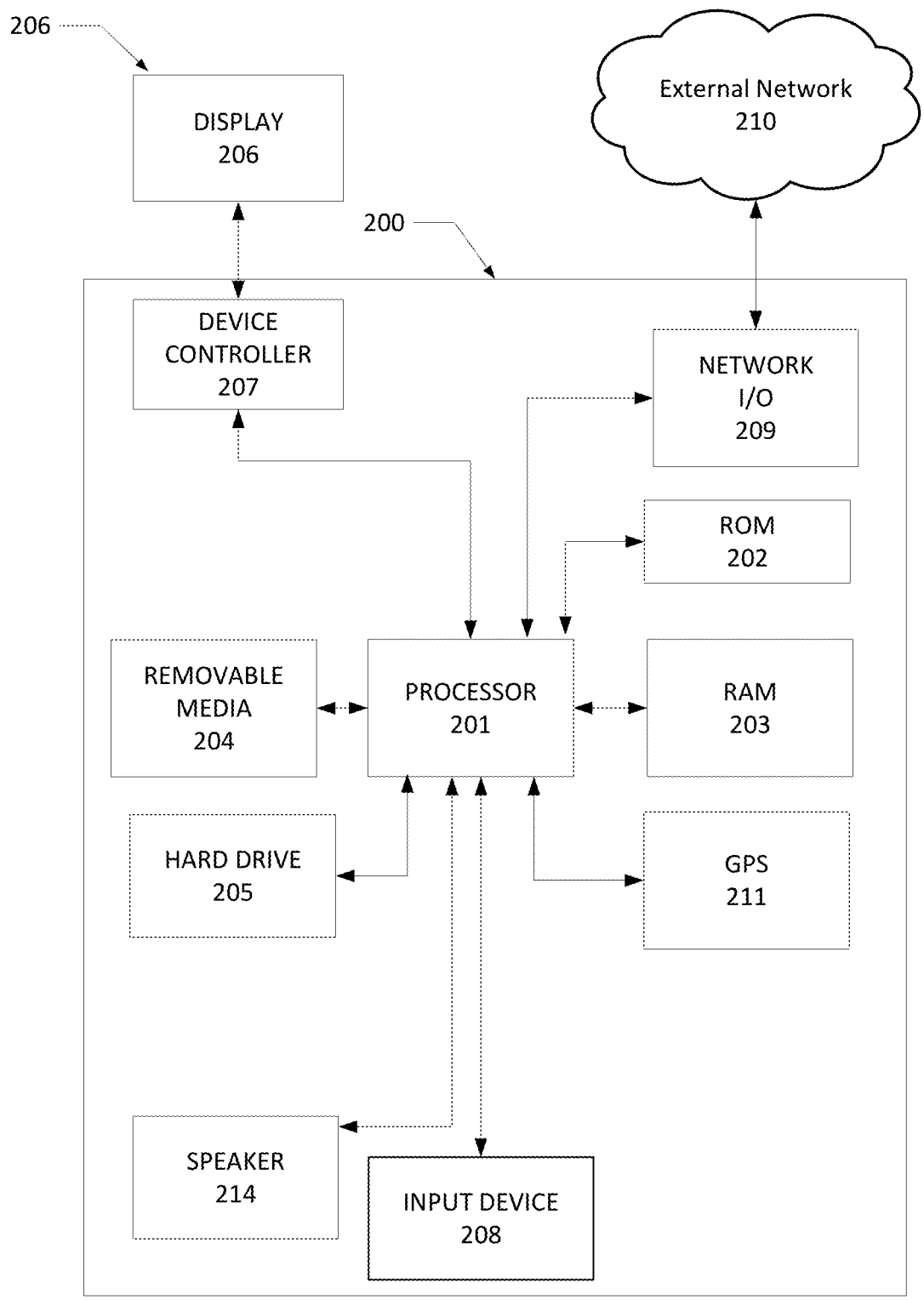
FIG. 2 shows hardware elements of a computing device.

FIG. 2 shows hardware elements of a computing device that may be used to implement any of the computing devices discussed herein. The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
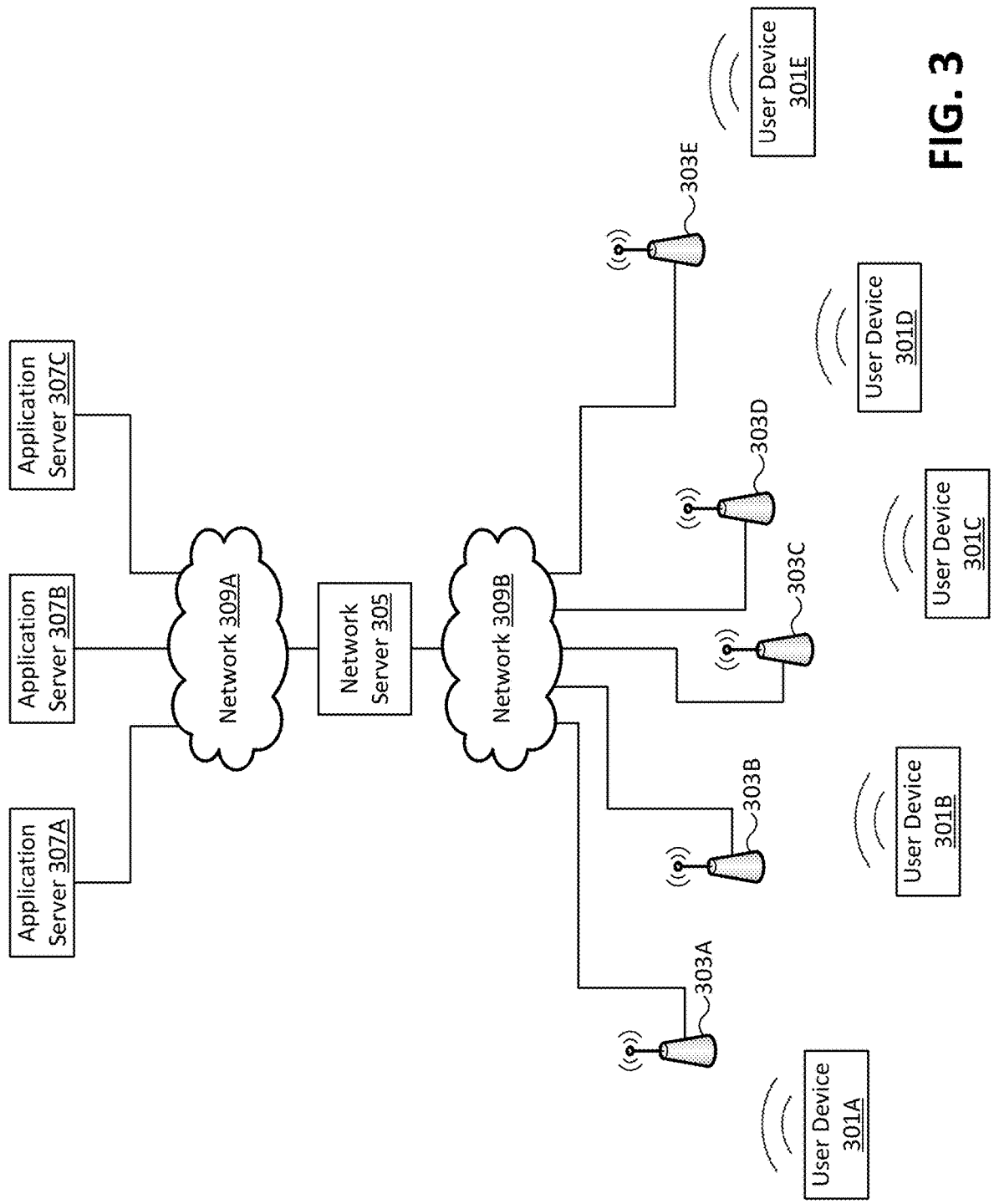
FIG. 3 is a schematic diagram showing an example system for routing messages in a network.

FIG. 3 is a schematic diagram showing an example system for routing messages in a network. The example system may include one or more user devices (e.g., user devices 301A-E), one or more gateways (e.g., gateways 303A-E), one or more network servers (e.g., network server 305), one or more application servers (e.g., application servers 307A-C), and one or more networks (e.g., networks 309A-B). The user devices 301A-E may communicate with the gateways 303A-E (e.g., wirelessly). The gateways 303A-E may communicate with the network server 305 via the network 309B. The network server 305 may communicate with the application servers 307A-C via the network 309A.

A user device of the user devices 301A-E may be any type of device, equipment, or object. For example, the user device may be a security system device such as a lock, camera, or sensor, a data transmitting device, and a display device such as a television. The user device may also be a household device such as window blinds, a thermostat, a lighting system, a home appliance (e.g., a refrigerator), or a personal device, such as a wearable (e.g., a watch, an activity tracker, glasses). The user devices may also be industrial, such as an automobile, a trash container, electrical grids, a smoke alarm, a vending machine, industrial equipment, and health related devices such as heart monitoring implants, biochip transponders, etc. Additionally or alternatively, the user device may be the servers 105-107, the devices 110-117, 125, the computing device 200, or other types of computers or devices.

A user device of the user devices 301A-E may include, for example, one or more sensors, one or more actuators, one or more communication interfaces, and/or one or more processors. The sensors may be configured to detect events or changes. For example, the user device may be a thermostat, and it may include a temperature sensor configured to determine the temperature in the surrounding environment. The actuators may be configured to move or control a mechanism (e.g., if they receive a control signal). For example, the user device may be a door lock, and it may include a door lock actuator configured to push the bolt into the socket to fasten the door. The communication interfaces may be configured to transmit and/or receive signals. For example, the communication interfaces may send data gathered by the sensors to another device, and/or receive control signals from another device. The processors may comprise the processors 201 and/or other types of processors, and may manage and/or coordinate among the sensors, the actuators, and the communication interfaces.

A gateway of the gateways 303A-E may be implemented as one or more computing devices, such as a router, a switch, etc. The gateway may establish communication links with the user devices 301A-E. The communication links between the gateway and the user devices 301A-E may be any type of communication link. The gateway may establish a backhaul link with the network 309B in order to communicate with the network server 305. The gateway's backhaul link may be any type of communication link, such as fiber, cellular, Ethernet, Wi-Fi, etc. The gateway may receive messages and forward those messages (modified or intact) to another device. For example, the gateway 303C may receive messages from one or more of the user devices 301A-E, and forward the messages to the network server 305.

A network of the networks 309A-B may be a single network or a collection of multiple connected networks. The network of the networks 309A-B may be any type of information distribution network, such as a satellite network, a telephone network, a cellular network, a Wi-Fi network, an Ethernet network, an optical fiber network, a coaxial cable network, a hybrid fiber coax network, etc. The network of the networks 309A-B may be a local area network (LAN), a wide area network (WAN), etc. Additionally or alternatively, the network of the networks 309A-B may be an Internet Protocol (IP) based network (e.g., the Internet). The networks 309A-B may use a plurality of interconnected communication links to connect among the gateways 303A-E, the network server 305, and the application servers 307A-C.

The network server 305 may be any type of computing device. From a physical standpoint, the network server 305 may be implemented as a single device (such as a single server) or as a plurality of devices (such as a plurality of distributed servers). An application server of the application servers 307A-C may be any type of computing device. For example, the application server may be the application server 107.

The example system of FIG. 3 may be used to implement low power long range networks (e.g., low power wide area networks (LPWAN)). For example, the example system may be used to implement LORA (Long Range), LORAWAN (Long Range Wide Area Network), SIGFOX, NB-IOT (Narrowband IoT), LTE-MTC (LTE Advanced for Machine Type Communications), or other low power long range network protocols. For example, the user devices 301A-E may communicate with the gateways 303A-E using the LORA physical layer protocol and upper layer protocols (e.g., LORAWAN).

In the example system, a user device of the user devices 301A-E may send (e.g., wirelessly broadcast) a message. The message may include a header indicating the user device as the source, and a payload indicating a unit of data that the user device wants to send to the network server 305 and/or the application servers 307A-C. Additionally or alternatively, the header of the message may indicate a frame counter counted by the user device. The user device may increment the value of the frame counter by one (1) every time the user device sends a next unit of data. If the user device sends the same unit of data again in a message, the value of the frame counter in the message may be the same value as or a different value from (e.g., an incremented value of) that of the previous message including the unit of data.

The message may be received by multiple gateways within the range of the user device. Each of the gateways may forward its received message to the network server 305. The network server 305 may receive, from the gateways, multiple messages that correspond to the same message sent by the user device.

The network server 305 may identify duplicate/redundant messages (e.g., if multiple messages have the same frame counter value, or other data indicating duplicity/redundancy), deduplicate the redundant messages, and send one deduplicated message to the application servers 307A-C. For example, the network server 305 may forward the earliest received message of the multiple messages, and may drop the subsequently received messages of the multiple messages.

In a confirmed uplink mode, the network server 305 may schedule acknowledgements of received messages to let the user devices know that their messages have been received. After receiving a forwarded message from a gateway, the network server 305 may identify the user device associated with the message (e.g., the user device from which the message was originated may be identified in the message). The network server 305 may send, to the user device, a confirmation that the message was received by the network server 305. Additionally or alternatively, after receiving a message associated with the user device, the application servers 307A-C may send a confirmation to the network server 305, which may forward the confirmation to the user device. The network device 305 may choose an optimal gateway (e.g., a gateway that is geographically closest to the user device, a gateway that has the lightest load, etc.) for forwarding the confirmation to the user device.

After sending a message, a user device may listen to incoming traffic to determine if a confirmation of the message is received from the network server 305 and/or the application servers 307A-C. If the user device does not receive a confirmation of the message (e.g., within a period of time), the user device may assume that the message previously sent was not successfully received by the network server 305 and/or the application servers 307A-C, and the user device may send the same message again. The confirmation of new uplink messages sent by the user device may help ensure that messages sent by a user device are received by the network server 305 or the application servers 307A-C.

In an unconfirmed uplink mode, the network server 305 and/or the application servers 307A-C might not send confirmations of received messages. And a user device might not have a mechanism to know whether the messages it sent were received by the network server 305 and/or the application servers 307A-C.

As discussed above, the network server 305 may receive, from the gateways, multiple messages that correspond to a same message sent by a user device. Configuring each gateway to forward all received messages to the network server 305 may help ensure fidelity and reliability in delivering data from a user device to the network server 305. For example, each gateway of the gateways 303A-E may receive a message from the user device 301C, and may forward the message to the network server 305. If the communication link between the gateway 303C and the network server 305 becomes unusable due to interference, the other gateways may still be able to deliver the message to the network server 305.

But this network architecture may cause an excessive amount of redundant data to be sent to the network server 305, if there are a large quantity of gateways within the range of a user device. For example, there may be one hundred gateways within the range of a user device, and forwarding messages from the user device. A heavy burden may be imposed on the network server 305, and network congestion may be caused at the network server 305. Additionally or alternatively, some gateways may have constrained backhaul links with limited bandwidth (e.g., cellular backhaul links). Configuring these gateways to forward every message they receive may cause those gateways to be overloaded.

Selectively disabling some gateways may help alleviate these challenges. Gateways may be disabled to various extents. For example, a gateway may be put into a standby mode (e.g., with its message forwarding functionalities turned off or with its functionalities to forward specific messages from specific devices turned off) if there are already a number of operating gateways that are located in close proximity to the gateway. Additionally or alternatively, a gateway may be disabled with respect to particular user devices. If a number of gateways are within the range of a user device, a subset of the gateways may be selected for forwarding messages from the user device, and the remaining gateways may be configured not to forward messages from the user device.

Selectively disabling gateway functions may help improve performance of the network server 305 by reducing the amount of redundant traffic. It may help improve performance of the gateways (e.g., by reducing the amount of data the gateways forward), especially if the gateways have constrained backhaul links. It may reduce network traffic, and help improve the overall performance of the network. Selectively disabling gateway functions may help improve efficiency in delivering data from the user devices to the network server 305 (e.g., by ensuring that there is redundancy, but not excessive redundancy). User experience may be improved because of less network congestion.

As further discussed in connection with FIGS. 4 and 5A-B, the gateways whose functions are to be disabled may be selected based on various factors, such as the distance between gateways, the communication range of a gateway, the distance between a gateway and a user device, a message's time of arrival, a message's signal to noise ratio, the antenna that the message was received on, etc. Additionally or alternatively, the selection may be based on a gateway's backhaul link condition. If a number of gateways are within the range of a user device, gateways with constrained backhaul links may be configured not to forward messages from the user device, if other gateways with better backhaul link conditions are available. But if a gateway with a constrained backhaul link is the only gateway within the range of a user device, the gateway may be configured to forward messages from the user device.

A forwarding priority table may be stored in a gateway, and may be used by the gateway to facilitate forwarding messages. The following shows an example forwarding priority table stored in a gateway.

| User device identifier | Forwarding priority |
|---|---|
| 0004A30B001E13DC | 3 |
| 0004A30B001E13DD | 5 |
| 0004A30B001E13DE | 1 |
| 0004A30B001E13DF | 2 |
| Default | 1 |

In the forwarding priority table, a user device may be identified by the user device identifier. The user device identifier may be the user device's Extended Unique Identifier (EUI), media access control (MAC) address, shorter device address (e.g., DevAddr in LORAWAN), or any other type of unique identifier. Each user device in the table may have a corresponding forwarding priority. The gateway may determine whether and/or when to forward messages received from a user device based on the forwarding priority corresponding to the user device. The forwarding priorities may be expressed in various manners (e.g., numbers, letters, or some other code).

In the confirmed uplink mode, if the network server 305 does not confirm receipt of a message sent by a user device, the user device may send the same message again. The gateway may receive the same message from the user device a number of times. If the number of times is equal to or larger than the forwarding priority for the user device, the gateway may forward the message. Otherwise, the gateway might not forward the message. For example, if the forwarding priority for a user device is one (1), the gateway may forward a message from the user device the first time the gateway receives the message. If the forwarding priority for a user device is a larger number M, the gateway may forward a message from the user device when the gateway receives the same message the Mth time and beyond. For reducing backhaul link usage or for other purposes, the gateway may be configured not to forward a message the first time the message is received or in a number of subsequent instances that the message is received. In the confirmed uplink mode, the gateway may determine that a message previously sent by a user device did not arrive at the network server 305 and/or the application servers 307A-C if the gateway receives a retransmission of the message. If the gateway receives a number of retransmissions of the message, and the number satisfies the forwarding priority for the user device, the gateway may start to forward the message to the network server 305, because other gateways failed to deliver the message to the network server 305.

In the unconfirmed uplink mode, the forwarding priority may be used in a similar manner as in the confirmed uplink mode. Because in the unconfirmed uplink mode a gateway might not receive messages that are the same (e.g., repeatedly sent by a user device), the gateway might only determine whether to forward messages the first time they are received. Hence forwarding priorities with a value of two (2) or larger may cause the gateway to produce the same results. For example, if the forwarding priority for a user device is one (1), the gateway may forward messages from the user device. If the forwarding priority for a user device is equal to or larger than two (2), the gateway might not forward messages from the user device. For example, if the gateway receives a message from the user device 0004A30B001E13DC in the unconfirmed uplink mode, the gateway might not forward the message to the network server 305 because the forwarding priority for the user device 0004A30B001E13DC is three (3). In the unconfirmed uplink mode, a gateway may be configured to forward messages from only user devices for which the gateway's forwarding priorities are equal to one (1).

Additionally or alternatively, for messages sent in the unconfirmed uplink mode, the forwarding priority may indicate a percentage of messages that the gateway may forward to the network server 305. For example, if the forwarding priority for a user device is one (1), the gateway may forward all (100%) of the messages received from the user device. If the forwarding priority for a user device is two (2), the gateway may forward 60% of the messages received from the user device. If the forwarding priority for a user device is three (3), the gateway may forward 30% of the messages received from the user device, and so on and so forth. For a given percentage, the gateway may use a random selection algorithm or other types of algorithms to select which of the messages received from the user device to forward to the network server 305, so that the given percentage of the messages received from the user device may be forwarded to the network server 305.

The forwarding priority table may also include a default forwarding priority. The default forwarding priority may be used if the gateway does not find a record corresponding to a particular user device in the forwarding priority table. For example, if a new user device comes online, the gateway might not have a record for the new user device in the forwarding priority table, and the gateway may use the default forwarding priority for the new user device. In the example forwarding priority table, the default forwarding priority is one (1), and the gateway may automatically treat a new user device as having a forwarding priority of one (1).

Additionally or alternatively, the forwarding priority table discussed above may be used specifically for the confirmed uplink mode, and a second table may be created for the unconfirmed uplink mode. In the second table, the forwarding priorities may be either one (1) or two (2), respectively indicating forwarding or not forwarding messages. The gateway may perform a function to map the forwarding priorities for the confirmed uplink mode to the forwarding priorities for the unconfirmed uplink mode. For example, in the mapping function, the forwarding priority for the unconfirmed uplink mode may be set to be one (1) if the forwarding priority for the confirmed uplink mode is one (1), and the forwarding priority for the unconfirmed uplink mode may be set to be two (2) if the forwarding priority for the confirmed uplink mode is equal to or larger than two (2). Additionally or alternatively, the second table may indicate the percentages of messages that the gateway may forward to the network server 305, and the percentages correspond to the different user devices. The gateway may perform a function to map the forwarding priorities for the confirmed uplink mode to the percentages used for the unconfirmed uplink mode.

Additionally or alternatively, the forwarding priority table may be represented in the form of a whitelist or a blacklist. For example, a whitelist may be a list of user devices whose forwarding priorities are one (1). To determine the forwarding priority for a user device, the gateway may determine whether the user device is listed in the blacklist or the whitelist, and/or determine in which list the user device is listed.

Figure 4:
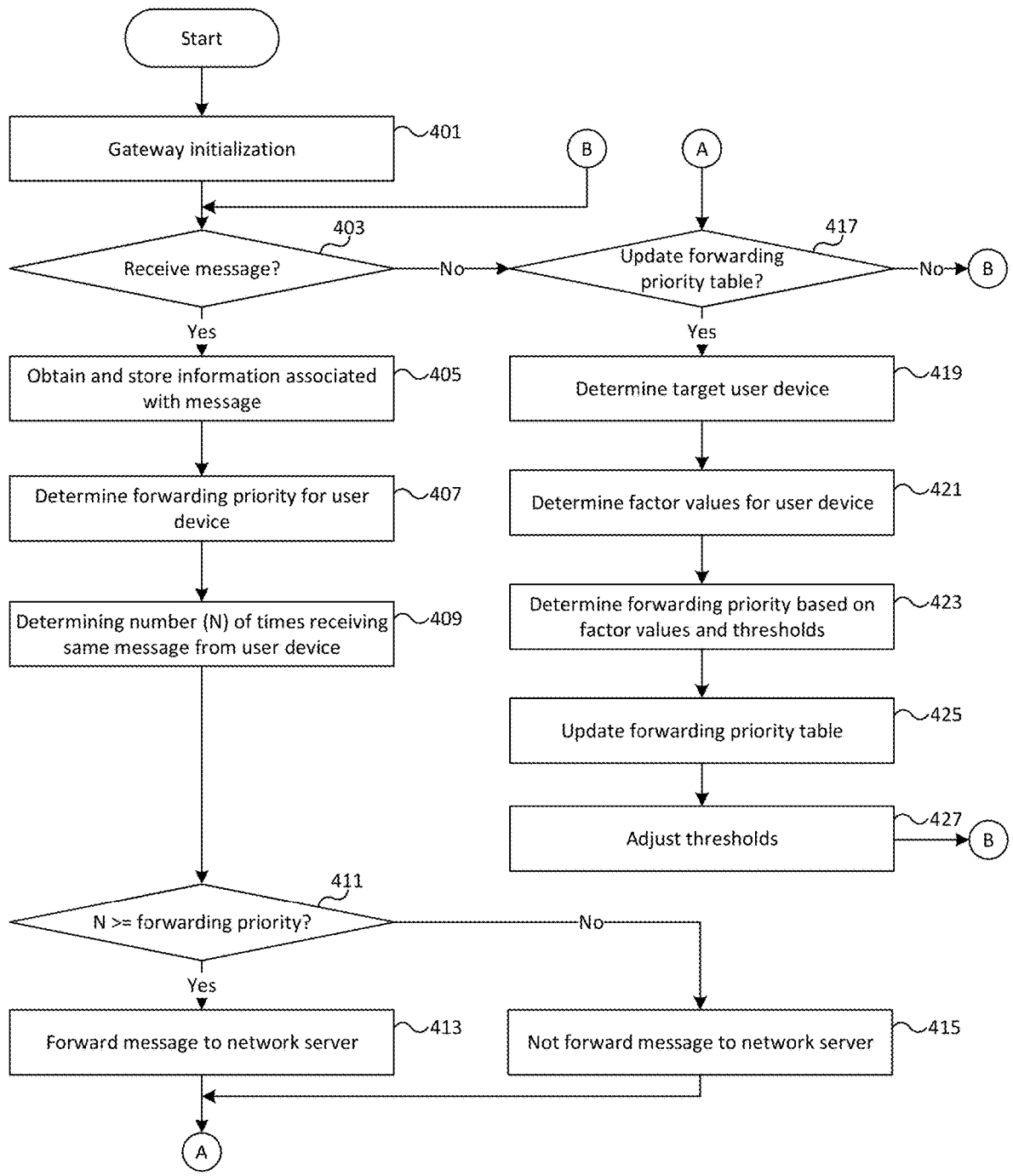
FIG. 4 is a flowchart showing an example method for forwarding messages in a network.

FIG. 4 is a flowchart showing an example method for forwarding messages in a network. The example method may be performed, for example, by the example system as discussed in connection with FIG. 3. The steps of the example method may be described as being performed by particular servers for the sake of simplicity, but the steps may be performed by any computing devices.

In step 401, a gateway may be initialized. The gateway initialization may include the gateway coming online (e.g., initially connected, powered on, etc.). The gateway may establish a backhaul link with the network 309B. The backhaul link may be any type of communication link, such as fiber, Ethernet, cellular, Wi-Fi, etc. The gateway may initialize its wireless circuitry (e.g., a LORA transceiver) for communicating with user devices. The gateway may create database tables for storing various types of data. For example, the gateway may create a forwarding priority table. The gateway may initialize computer programs and load programmatic rules into memory (e.g., rules related to forwarding messages or adjusting forwarding priorities).

The gateway may determine its gateway information, such as the gateway's owner, geographical location, communication range, etc. The gateway may prompt a person deploying the gateway to enter, via a user interface, various types of information. For example, the gateway may ask the person to enter his or her personal information (e.g., the person's customer identification if the person is a customer of the company operating the network server 305). The gateway may ask the person to enter the geographical location in which the gateway is located, such as the longitude, latitude, and/or altitude of the gateway's location, and/or the street address and zip code of the gateway's location. The gateway may ask the person to enter information regarding the gateway's communication range, identifier, and/or backhaul link type and/or bandwidth. Additionally or alternatively, the various types of information may be stored in gateway memory when the gateway was manufactured, and/or may be determined by the gateway itself. For example, the gateway may be configured to determine its backhaul link bandwidth using a traffic monitoring program.

The gateway may try to establish a connection with the network server 305. For example, the gateway may send an initial connection request to the network server 305. The initial connection request (and/or subsequent messages to the network server 305) may indicate the determined gateway information. After sending the initial connection request, the gateway may receive, from the network server 305, a response indicating an initial handshake between the gateway and the network server 305.

The response (and/or subsequent messages from the network server 305) may indicate configuration data, which may, for example, instruct the gateway to configure its default forwarding priority to be a certain value. For example, the initial connection request may indicate that the gateway has a cellular backhaul link, and in response the network server 305 may determine to configure the gateway's default forwarding priority to be two (2). More details on configuring the gateway by the network server 305 based on gateway information are further discussed in connection with FIG. 5. Additionally or alternatively, the gateway may configure itself. For example, the gateway may configure its default forwarding priority based on its backhaul link condition. If the gateway's backhaul link bandwidth (e.g., the gateway's available backhaul link bandwidth and/or the gateway's total backhaul link bandwidth) is below a threshold bandwidth (e.g., 1 Mbps), the gateway may set its default forwarding priority to be two (2) or a larger number (in order to save its backhaul link bandwidth). Same or different default forwarding priorities may correspond to different ranges of the backhaul link bandwidth. Similarly, the gateway may configure its default forwarding priority based on a data usage limit of its backhaul link (e.g., based on a maximum amount of data allowed to be sent via the backhaul link in a time period).

Additionally or alternatively, the gateway may have multiple default forwarding priorities corresponding to different types of user devices. For example, for a given backhaul link bandwidth, the default forwarding priority for a mobile user device may be one (1), and the default forwarding priority for a stationary user device may be two (2). For a given backhaul link bandwidth, the default forwarding priority for a battery supported user device may be one (1), and the default forwarding priority for a power line supported user device may be two (2). Additionally or alternatively, the default forwarding priorities may be determined based on the gateway's backhaul link bandwidth and the user device type. Additionally or alternatively, the default forwarding priorities (and/or the forwarding priorities corresponding to the specific user devices as discussed herein) may be determined and/or updated based on other types of network conditions, such as the gateway's backhaul link latency, signal strength or interference, etc.

After step 401, the method may proceed to step 403. In step 403, the gateway may determine whether a message, such as a broadcast message, is received from any user devices that the gateway is configured to recognize. If the gateway determines that a message is received, the method may proceed to step 405. Otherwise, the method may proceed to step 417.

In step 405, the gateway may obtain and store information associated with the received message. For example, the gateway may extract, from the received message, header data (e.g., an identifier of the user device that sent the message, the value of a frame counter counted by the user device), payload data, and/or other data. If the payload data is encrypted, the gateway may decrypt the payload using a decryption key. The gateway may measure the signal strength (e.g., the signal to noise ratio) associated with the message. The gateway may create a message information table, and may store the obtained information in the message information table.

Additionally or alternatively, the gateway may determine a confirmation mode (the confirmed uplink mode or the unconfirmed uplink mode) associated with message and/or the user device that sent the message. For example, the message itself may indicate whether a confirmation of receipt of the message is requested by the user device that sent the message. Additionally or alternatively, the user device may send a separate message indicating whether the user device is operating in the confirmed uplink mode or in the unconfirmed uplink mode. Additionally or alternatively, the user device, the gateway, and the network server 305 may, through other messages or protocols, agree on whether the user device is sending messages in the confirmed uplink mode or in the unconfirmed uplink mode.

After step 405, the method may proceed to step 407. In step 407, the gateway may determine the forwarding priority for the user device that sent the message. The gateway may search, based on the user device identifier, the forwarding priority table to find the forwarding priority corresponding to the user device.

The gateway may determine whether a record corresponding to the user device exists in the forwarding priority table in the gateway. If a record corresponding to the user device exists in the forwarding priority table, the gateway may obtain the value of the forwarding priority corresponding to the user device. Otherwise, the gateway may set the forwarding priority for the user device to be the gateway's default forwarding priority. The gateway may insert a new record into the forwarding priority table, and the new record may correspond to the user device and may indicate the default forwarding priority. Additionally or alternatively, if different forwarding priority tables are used for the confirmed uplink mode and for the unconfirmed uplink mode, the gateway may, based on the confirmation mode associated with the user device and/or the message, obtain the corresponding forwarding priority.

After step 407, the method may proceed to step 409. In step 409, the gateway may determine a quantity of times that the message has been received from the user device. For example, the gateway may create a first variable, which may store the last message that was sent by the user device and was received by the gateway. The gateway may create a second variable (e.g., a counter) that is initially set to be zero. After the gateway receives a message from the user device, the gateway may compare the message with the last message stored in the first variable. If they are different, the gateway may determine that the message is received the first time. The gateway may set the second variable to be one, and the gateway may reset the value of the first variable to be the message. Otherwise, the gateway may determine that the message was previously received. The gateway may increment the value of the second variable by one, and the gateway might not change the value of the first variable.

The gateway may determine whether two messages received from a user device are the same based on comparing the entire message contents, as messages retransmitted by a user device may be exactly identical. Additionally or alternatively, messages retransmitted by a user device may have the same frame counter value. And the gateway may determine whether two messages are the same based on comparing the frame counters in the messages. Additionally or alternatively, the gateway may compare the payloads of two messages, and if the payloads of two messages are the same, the gateway may determine that the two messages are the same (e.g., duplicate/redundant) and/or that the later received message of the two messages was retransmitted. After step 409, the method may proceed to step 411.

In step 411, the gateway may determine whether the quantity of times that the message has been received from the user device exceeds the forwarding priority for the user device. Additionally or alternatively, this determination may be based on whether the quantity of times satisfies (e.g., exceeds or meets) a threshold for forwarding the message or any other desired threshold point. If the answer is yes, the gateway may forward the message to the network server 305 in step 413. Otherwise, the gateway might not forward the message to the network server 305 in step 415, and after step 415, the method may proceed to step 417.

In step 413, the gateway may forward the message to the network server 305. The outgoing message may be an intact or modified version of the received message. The gateway may include in the outgoing message some data in addition to all or a portion of the received message. The outgoing message may include, for example, an identifier of the gateway, an identifier of the network server 305 as the destination, an identifier of the user device that sent the received message, the unit of data included in the payload of the received message, the value of the frame counter in the header of the received message, the signal to noise ratio associated with the received message, and/or other information associated with the received message.

Additionally or alternatively, in the unconfirmed uplink mode, some user devices may employ payload redundancy. When a user device sends a unit of data (e.g., data related to temperature in the user device's surrounding area), the unit of data might not be sent alone in a message. Rather, the unit of data and a predetermined number of previous units of data may be combined together to be included in a message. In this manner, if the message is lost, the unit of data may be included in a future message. For example, a message sent by a user device may include several data units (e.g., data unit 1, data unit 2, data unit 3, data unit 4, and data unit 5). When the user device wants to send data unit 6, the user device may send data unit 6 together with the last four data units in a next message, which may include data unit 2, data unit 3, data unit 4, data unit 5, and data unit 6. Similarly, when the user device wants to send data unit 7, the user device may send a message including data units 3, data units 4, data unit 5, data unit 6, and data unit 7. Additionally or alternatively, each time a user device broadcasts its message (e.g., announcing the current temperature in its surrounding area), the message may actually contain the contents of the current message and a predetermined number of previous messages, so that sequential messages may have overlapping payload contents. In this manner, the loss of some messages may be accounted for by having the same contents in one or more other messages.

The gateway may determine that the user device is employing this type of payload redundancy, and may forward only one of a number of successively received messages. For example, if a data unit is configured to be sent N times using the payload redundancy, the gateway may forward only one of N messages sequentially received from the user device. Additionally or alternatively, the gateway partition the received message into N segments, where each segment represents a data unit, and the gateway may forward only one of the N segments of the received message. For example, the gateway may forwarding only the first segment of every received message. Additionally or alternatively, the gateway may determine new data (e.g., non-redundant data) in a received message, and may forward the new data to the network server 305. For example, a previous message received from the user device may include data units 3, data units 4, data unit 5, data unit 6, and data unit 7, and a current message received from the user device may include data units 4, data unit 5, data unit 6, data unit 7, and data unit 8. The gateway may determine that data unit 8 was not included in the previous message and is new data. The gateway may forward the data unit 8 to the network server 305, and might not forward, to the network server 305, the data units 4, the data unit 5, the data unit 6, and the data unit 7.

In step 415, the gateway might not forward the message to the network server 305. For example, the gateway may simply drop the message. Additionally or alternatively, the gateway may be configured to store (e.g., in a cache or other type of memory) a number of messages that the gateway previously received from a user device (e.g., the last 10 messages, the last 20 messages, the last 50 messages, etc.). For example, after forwarding a message in step 413 or determining not to forward the message in step 415, the gateway may store the message. The messages stored in the gateway may be retrieved by the network server 305. For example, if the network server 305 determines that a substantial portion of packets sent by a user device failed to reach the network server 305 (e.g., in the unconfirmed uplink mode), the network server 305 may send, to one or more gateways, a request for the lost messages. The request may indicate the user device that sent the lost messages, and/or the frame counter values of the lost messages. In particular, the network server 305 may send such a request to gateways configured not to forward messages from the user device (e.g., in the unconfirmed uplink mode). In response to the request, a gateway of the gateways may determine if it stores the lost messages, and may send the lost messages to the network server 305 if the gateway stores the lost messages.

After step 413 or step 415, the method may proceed to step 417. In step 417, the gateway may determine whether to update the gateway's forwarding priority table. The gateway may determine to update the forwarding priority table based on network condition changes. For example, the gateway may determine to update the forwarding priority table periodically (e.g., every ten days, every month, etc.). Additionally or alternatively, the gateway may continuously or periodically monitor its backhaul link usage rate (e.g., the volume of outgoing traffic divided by the total amount of backhaul link bandwidth), and may determine to update the forwarding priority table if the gateway's backhaul usage rate changes by a threshold value or more or reaches a threshold value.

Additionally or alternatively, the gateway may determine to update the forwarding priority table if the gateway detects that a new user device begins sending messages to the gateway. As discussed in connection with step 407, after a new user device shows up to the gateway, the gateway may insert, into the forwarding priority table, a new record that corresponds to the new user device. The gateway may determine to continue to update the new device's forwarding priority record based on current network conditions. Additionally or alternatively, the gateway may determine to update the forwarding priority table, if the gateway receives, from the network server 305, instructions to update forwarding priorities for one or more user devices, and/or to update the gateway's default forwarding priority.

If the gateway determines to update the forwarding priority table, the method may proceed to step 419. Otherwise, the method may go back to step 403. In step 419, the gateway may determine one or more user devices for which the forwarding priorities are to be updated. The gateway may select all or a portion of the user devices listed in the forwarding priority table, and update the forwarding priorities for the selected user devices.

Additionally or alternatively, the user devices may be selected based on the conditions triggering the update decision in step 417. For example, if the gateway determined to update the forwarding priority table because of instructions from the network server 305, the gateway may determine to update the forwarding priorities for the user devices identified in the instructions. If the triggering condition was that a new user device was detected, the gateway may determine to update the forwarding priority for the new user device. If the triggering condition was that the backhaul link usage change exceeds a threshold, or that the update is to be performed periodically, the gateway may determine to update forwarding priorities for all or a portion of the user devices listed in the forwarding priority table.

After step 419, the method may proceed to step 421. In step 421, the gateway may determine, for each user device whose forwarding priority is to be updated, values of the factors relevant to determining the forwarding priority. The forwarding priority for a user device may be adjusted based on various factors, such as the gateway's importance to the user device, the user device's transmission periodicity or data rate, the user device's battery life usage, etc.

If the gateway is the only one within the range of a user device, it may be necessary for the gateway to forward messages from the user device because no other gateway might be able to forward messages from the user device. The gateway may determine whether the gateway is important to a user device based on a packet loss rate delta. A packet loss rate may indicate a rate of failure in delivering a unit of data from a user device to the network server 305. The gateway may measure a first packet loss rate when the gateway does not forward messages from the user device. The gateway may measure a second packet loss rate when the gateway forwards messages from the user device. And the packet loss rate delta may be equal to the first packet loss rate minus the second packet loss rate.

The packet loss rate delta may indicate the change to the packet loss rate caused by the gateway forwarding messages for the user device. If the packet loss rate delta is large, it may indicate that only the gateway is within the range of the user device. Additionally or alternatively, if the first packet loss rate is very high (e.g., approaching 100%), that may indicate that almost all messages sent by the user device are lost if the gateway does not forward messages from the user device. In this situation, if the second packet loss rate is lower than the first packet loss rate to some substantial degree, it may indicate that only the gateway is within the range of the user device.

A user device's transmission periodicity or data rate may affect the gateway's backhaul link usage. If the user device sends messages at a high frequency or at a high data rate, the gateway may have to use a substantial portion of its backhaul bandwidth to forward messages from the user device. If the gateway has a constrained backhaul link, it may advantageous for the gateway to forward less messages from the user device (e.g., in order to save bandwidth for other user devices).

The user device's battery life usage may optionally affect the gateway's decision as to whether to forward messages from the user device. If a user device's battery life is lower than a threshold (e.g., 5%), the gateway may forward messages from the user device. For example, the user device may be configured to continuously or periodically send (e.g., broadcast) its battery life status, and the gateway may receive the user device's battery life status data. The gateway may additionally or alternatively be configured to send, to the user device, requests to obtain the user device's battery life status data. As an example, the requests may comprise the DevStatusReq commands in LORAWAN. The gateway may optionally be configured to forward messages from the user device, if the gateway determines that the battery life of the user device is lower than the threshold (e.g., regardless of other conditions or determinations). In this way, messages from the user device may have a higher success rate to be delivered to the network server 305, and may be less likely to be sent repeatedly in the confirmed uplink mode. It may help save battery life of the user device. The gateway may determine whether the user device is powered by a battery or a power line. If the user device powered by a battery, the gateway may be more likely to forward messages from the user device, in order to save battery life. If the user device powered by a power line, the gateway may be less likely to forward messages from the user device because the power line supplies power to the user device.

The values of the factors may be measured, and may be stored in a factor value table. The following shows an example factor value table.

| User device identifier | Measured first packet loss rate | Measured second packet loss rate | Packet loss rate delta | Transmission periodicity or data rate | Battery life usage |
|---|---|---|---|---|---|
| 0004A30B001E13DC | 90% | 10% | 80% | 24/day | 20% |
| 0004A30B001E13DD | 100% | 40% | 60% | 6/day | 80% |

-continued

| User device identifier | Measured first packet loss rate | Measured second packet loss rate | Packet loss rate delta | Transmission periodicity or data rate | Battery life usage |
|---|---|---|---|---|---|
| 0004A30B001E13DE | 70% | 50% | 20% | 1200/day | 90% |
| 0004A30B001E13DF | 10% | 10% | 0% | 2/day | Connected to power line |

In the confirmed uplink mode, the gateway may itself determine the packet loss rate associated with a user device. The gateway may listen to the incoming traffic, and identify messages sent by the user device. The gateway may count how many times a same message was sent by the user device. If the gateway determines that a same message was sent T times, the packet loss rate may be (T−1)/T. In the confirmed uplink mode, if the user device does not receive a confirmation of a message from the network server 305, the user device may send the same message again. If the gateway receives a same message T times, the gateway may determine that the first T−1 messages were lost during transmission. The gateway may measure the packet loss rate based on a larger number of data points (e.g., the gateway may calculate an average packet loss rate delta based on a number of messages).

In the confirmed uplink mode, to determine the first packet loss rate, the gateway may stop forwarding messages from the user device for a period of time, and calculate the first packet loss rate according to the method discussed above. The gateway may then start forwarding messages from the user device for a period of time, and calculate the second packet loss rate according to the method discussed above. Additionally or alternatively, the gateway may send, to other gateways, a message indicating that the gateway is to measure the first packet loss rate and the second packet loss rate, and requesting the other gateways to forward messages from the user device in the meantime. This may help prevent one or more other gateways from changing their forwarding priorities corresponding to the user device, and from interfering with the gateway's measurement of the first packet loss rate and the second packet loss rate.

In the unconfirmed uplink mode, the network server 305 may determine the packet loss rate associated with a user device. A message sent by a user device may indicate a frame counter. The user device may increment the frame counter by one every time the user device sends a next unit of data. When a gateway forwards a message sent by the user device, the gateway may include the frame counter in the outgoing message. The network server 305 may determine, based on the frame counter, the packet loss rate associated with the user device. For example, the network server 305 may receive a message associated with the user device, and the value of the frame counter indicated in the message may be P. The network server 305 may receive a next message associated with the user device, and the value of the frame counter indicated in the next message may be Q. If Q minus P is larger than one, it may indicate that the messages with frame counter values between P and Q are lost. For example, if a first message has a frame counter value of 52, and a second message has a frame counter value of 55, the network server 305 may determine that the messages with frame counter values of 53 and 54 are lost during transmission. And the packet loss rate here may be 50% (i.e., messages with frame counter values of 52 and 55 are received, and messages with frame counter values of 53 and 54 are lost). The network server 305 may determine the packet loss rate based a larger number (e.g., 100) of messages.

The gateway may obtain, from the network server 305, information related to packet loss rates associated with user devices (or other type of information related to determining forwarding priorities). For example, the gateway may send, to the network server 305, a message indicating one or more user devices, and the network server 305 may in response send, to the gateway, packet loss rate information associated with the one or more user devices. When sending the message to the network server 305, the gateway may use a bloom filter to indicate the one or more user devices. The bloom filter may help reduce the amount of data that the gateway sends to the network server 305 in obtaining the packet loss rate information. For example, the gateway may send, to the network server 305, a bloom filter of all the user devices from which the gateway has received a message, in order to obtain the packet loss rate information associated with those user devices. The gateway may first be configured not to forward messages from the user devices (e.g., if the gateway has a constrained backhaul link and/or it has a large default forwarding priority value), and may obtain information related to the first packet loss rates associated with the user devices (e.g., using the bloom filter). The gateway may then start to forward messages from the user devices, and may obtain information related to the second packet loss rates associated with the user devices. Additionally or alternatively, the gateway may start to forward messages from user devices whose first packet loss rates are above a threshold (e.g., 50%), and may obtain information related to the second packet loss rates associated with those user devices. Based on the obtained information, the gateway may determine or update its forwarding priority table (e.g., for the user devices whose information has been obtained from the network server 305) as discussed herein.

In the unconfirmed uplink mode, the gateway may send, to the network server 305, a request to obtain the packet loss rate delta associated with a user device. The network server 305 may optionally measure the first packet loss rate by instructing the gateway to temporarily stop forwarding messages from the user device, and instructing other gateways to temporarily start forwarding messages from the user device. The network server 305 may measure the first packet loss rate in that temporary period. Then the network server 305 may measure the second packet loss rate by instructing the gateway and the other gateways to temporarily start forwarding messages from the user device. The network server 305 may measure the second packet loss rate in that temporary period. The network server 305 may send the measured first packet loss rate and the measured second packet loss rate to the gateway. Additionally or alternatively, the network server 305 may sort its received messages sent by the user device, based on the gateways that forwarded the messages. The network server 305 may calculate a packet loss rate of each gateway or a group of gateways. For example, the network server 305 may identify its received messages sent by the user device that were forwarded by a group of gateways, and determine, based on the frame counter values of those identified messages, a packet loss rate of the group of gateways. The packet loss rate of the group of gateways may indicate a rate of failure in delivering a unit of data from a user device to the network server 305 by the group of gateways. In this manner, the network server 305 may determine a packet loss rate of a first group of gateways including the gateway that sent the request and other gateways, when the gateway is configured to forward messages from the user device. This packet loss rate may correspond to the measured second packet loss rate. The network server 305 may then determine a packet loss rate of a second group of gateways including only the other gateways. This packet loss rate may correspond to the measured first packet loss rate.

The gateway may determine a transmission period of the user device based on the received messages from the user device. The gateway may determine what percentage of its backhaul link bandwidth is used for forwarding messages from the user device. The user device may measure its battery life, and include the data in a message sent to the gateway. The gateway may determine the user device's battery life usage by receiving the message from the user device.

After step 421, the method may proceed to step 423. In step 423, the gateway may determine, based on the factor values determined in step 421, the forwarding priority for a user device. If the factor values (or factor value changes) satisfies certain thresholds, the gateway may set the forwarding priority to be a corresponding value and/or change the forwarding priority value by a certain degree (e.g., decrease or increase the forwarding priority by one (1)). The gateway may determine the forwarding priority for the user device based on the packet loss rate delta. For example, if the packet loss rate delta associated with a user device is higher than a threshold (e.g., 70%), the gateway may assume that only the gateway is within the range of the user device, and may set the forwarding priority for the user device to be one (1) (or lowering the forwarding priority value for the user device). The threshold may be changed or adjusted by the gateway. For example, the gateway may increase the threshold (e.g., from 70% to 80%) in order to reduce the amount of data sent via the gateway's backhaul link.

Additionally or alternatively, the forwarding priority value may be adjusted for different ranges of the packet loss rate delta. For example, if the packet loss rate delta is between 50% and 70%, the forwarding priority may be set to be two (2). And if the packet loss rate delta is between 30% and 50%, the forwarding priority may be set to be three (3), and so forth. The forwarding priority values corresponding to the different ranges may be changed or adjusted by the gateway. For example, the gateway may increase the forwarding priority value corresponding to each range (e.g., by one (1)) in order to reduce the amount of data sent via the gateway's backhaul link. Additionally or alternatively, the gateway may rank user devices in terms of their packet loss rate delta, and choose a group of top ranking user devices, and set the forwarding priorities for those user devices to be one (1). Additionally or alternatively, the gateway may determine the forwarding priority for a user device based on the first packet loss rate associated with the user device. For example, if the first packet loss rate associated with a user device is higher than a first threshold (e.g., 95%), and the packet loss rate delta associated with the user device is higher than a second threshold (e.g., 40%), the gateway may set the forwarding priority for the user device to be one (1). The thresholds may be changed or adjusted by the gateway. For example, the gateway may increase the first threshold (e.g., from 95% to 98%) and increase the second threshold (e.g., from 40% to 50%) in order to reduce the amount of data sent via the gateway's backhaul link.

The gateway may determine the forwarding priority for the user device based on the transmission frequency or data rate associated with the user device. For example, the higher the transmission frequency or data rate, the larger the gateway may set the value of the forwarding priority. The transmission frequency or data rate may become more important and may have more weight if the gateway's available backhaul link bandwidth becomes smaller. For example, if the data rate of the user device is lower than a threshold (e.g., 50 Kbps), the gateway may set the forwarding priority for the user device to be one (1). The threshold may be changed or adjusted by the gateway. For example, the gateway may decrease the threshold (e.g., from 50 Kbps to 10 Kbps) in order to reduce the amount of data sent via the gateway's backhaul link.

The gateway may determine the forwarding priority for the user device based on the battery life usage associated with the user device. In the confirmed uplink mode, if the user device's battery life is lower than a threshold and/or if the gateway can reduce the packet loss rate associated with the user device to some substantial extent, the gateway may set the forwarding priority to be a small value in order to save some battery life for the user device. For example, if the battery life of a user device has only 20% left, and/or if the packet loss rate delta associated with the user device is higher than a threshold (e.g., 30%), the gateway may set the forwarding priority for the user device to be one (1). If the user device is powered by a constant power source (e.g., connected to a power line instead of a battery), the gateway is less concerned about saving battery life for the user device. The threshold used for comparing with the user device's battery life may be changed or adjusted by the gateway. For example, the gateway may decrease the threshold (e.g., from 20% to 5%) in order to reduce the amount of data sent via the gateway's backhaul link.

The gateway may assign a weight to each factor, and may calculate a weighted score for a user device based on the factor values. Weights may be applied to each factor to prioritize some factors over others. For example, the gateway may assign a weight of 4 to the packet loss rate delta, a weight of 3 to the data rate, and a weight of 2 to the battery life usage. If k represents a particular user device, $W_i(k)$ represents the weight assigned to a given factor i (e.g., battery life usage) for the user device k, $T_i(k)$ represents the value of the given factor i for the user device k, and S (k) represents the weighted score for the user device k, the weighted score may be calculated according to the following equation:

$$S(k) = \sum_{i=1}^{N} W_i(k) * T_i(k) \qquad (1)$$

Additionally or alternatively, the gateway may determine distributions for the factors. The distributions may vary in type and/or calculation based on the factor. With the distributions, the raw values of the factors may be provided with context. One exemplary distribution may be a derivative distribution. For example, the gateway may determine a previous value of a factor and determine a difference between the current value and the previous value. The gateway may use the difference, instead of the current value, for calculating the weighted score. An alternative distribution may be a normal (e.g., Gaussian) distribution. The gateway may determine the standard deviation of a factor value associated with a user device versus the average factor value for any user devices. Any other statistical methods useful for analyzing data may be applied.

If the weighted score is higher than a threshold score, the gateway may set the value of the forwarding priority for the user device to be one (1). The lower the weighted score, the larger the gateway may set the value of the forwarding priority for the user device. Additionally or alternatively, the gateway may rank user devices in terms of their respective weighted scores, and determine their forwarding priority values based on their respective rankings. Additionally or alternatively, the weights assigned to the factors may vary based on the gateway's backhaul link condition. For example, the transmission frequency or data rate may become more important and may have more weight if the gateway's available backhaul link bandwidth becomes smaller.

Additionally or alternatively, in the confirmed uplink mode, the gateway may use data associated with received messages (e.g., the data stored in the message information table of the gateway) and/or the gateway's current forwarding priority for the user device. For example, if the current forwarding priority value for a user device is R, the gateway might not forward a message from the user device within the first R−1 times of receiving the same message. The gateway may start to forward the message at the Rth time of receiving the same message. The gateway may determine the total number of times of receiving the same message (e.g., a total number of S times). S−R+1 may represent the number of times that the gateway forwarded the same message. If (S−R+1)/(R−1) is large, the gateway may determine using the gateway to forward messages from the user device might not help successful delivery of the message, and the gateway may increase the forwarding priority value for the user device. Otherwise, the gateway may decrease the forwarding priority value for the user device.

For example, if the current forwarding priority for a user device is one (1), and the gateway receives a same message from the user device 9 times (e.g., on average), the gateway may determine that the gateway does not help very much, and may set the forwarding priority for the user device to be 5. If the current forwarding priority for the user device is 9, and the gateway receives a same message from the user device 9 times (e.g., on average), the gateway may determine that the gateway does help very much, and the gateway may set the forwarding priority for the user device to be 5.

After step 423, the method may proceed to step 425. In step 425, the gateway may update the forwarding priority record corresponding to a user device with the determined forwarding priority for the user device. After step 425, the method may proceed to step 427.

In step 427, the gateway may adjust the various thresholds discussed above used for determining forwarding priorities. The gateway may determine to update its forwarding priority table based on the gateway's backhaul link data usage limit (e.g., based on a maximum amount of data allowed to be sent via the backhaul link in a time period). For example, if a gateway uses a cellular backhaul link with 1 GB of data per month, the gateway may start to increase all or a portion of the forwarding priority values in its forwarding priority table (e.g., increase the values by one (1)) to reduce the amount of data sent upstream if the gateway has used 500 MB of data in that month. As the data usage continues to rise, the gateway may adjust the forwarding priority table to attempt to use under 1 GB of data in the month, without having to be shut off entirely early in the month. The gateway may additionally or alternatively reduce the amount of data sent upstream via its backhaul link by adjusting the various thresholds used for determining forwarding priorities.

The gateway may calculate an allowed amount of data per day (or per six (6) hours, or per hour, etc.) based on, for example, its monthly data usage limit. For example, if a gateway uses a cellular backhaul link with 1 GB of data per month, the allowed amount of data per day may be equal to 1 GB divided by the number of days in the month (e.g., 0.034 GB per day). The gateway may determine the amount of data actually sent via its backhaul link in a day. If the actual amount of data sent in one day is larger than the allowed amount of data per day by a threshold amount (e.g., 0.002 GB), the gateway may determine to update its forwarding priority table in such a way that the actual amount of data sent in the next day may be reduced. For example, the gateway may increase the threshold score that is used for comparison with the weighted score in determining forwarding priorities. With the increased threshold score, a user device that was previously assigned with a small forwarding priority value (e.g., one (1)) using the processes discussed above (e.g., in step 423) may now be assigned with a large forwarding priority value (e.g., three (3)) using the same processes. Similarly, the other thresholds discussed above may be adjusted in order to reduce the amount of data actually sent via its backhaul link per day.

If the actual amount of data sent in one day is smaller than the allowed amount of data per day by a threshold amount (e.g., 0.002 GB per day), the gateway may determine to update its forwarding priority table in such a way that the actual amount of data sent in the next day may be increased. For example, the gateway may decrease the threshold score that is used for comparison with the weighted score in determining forwarding priorities. With the decreased threshold score, a user device that was previously assigned with a large forwarding priority value (e.g., three (3)) using the processes discussed above (e.g., in step 423) may now be assigned with a low forwarding priority value (e.g., one (1)) using the same processes. Similarly, the other thresholds discussed above may be adjusted in order to increase the amount of data actually sent via its backhaul link per day. By adjusting the forwarding priority table (and/or the thresholds) in this way, the gateway may control its data usage limit to be used gradually. The gateway may monitor the amount of data actually sent upstream during a time period (e.g., an hour, a day), may adjust the thresholds based on the monitored amount of data, and may update all or a portion of the forwarding priority values in its forwarding priority table based on the adjusted thresholds. The adjustments to the thresholds may be, for example, proportional to the degree of the difference between the monitored amount of data during the time period and the allowed amount of data during the time period. Using this feedback loop, the amount of data actually sent upstream via the gateway's backhaul link during a time period may converge to the allowed amount of data during the time period. After step 427, the method may go back to step 403.

Figure 5A:
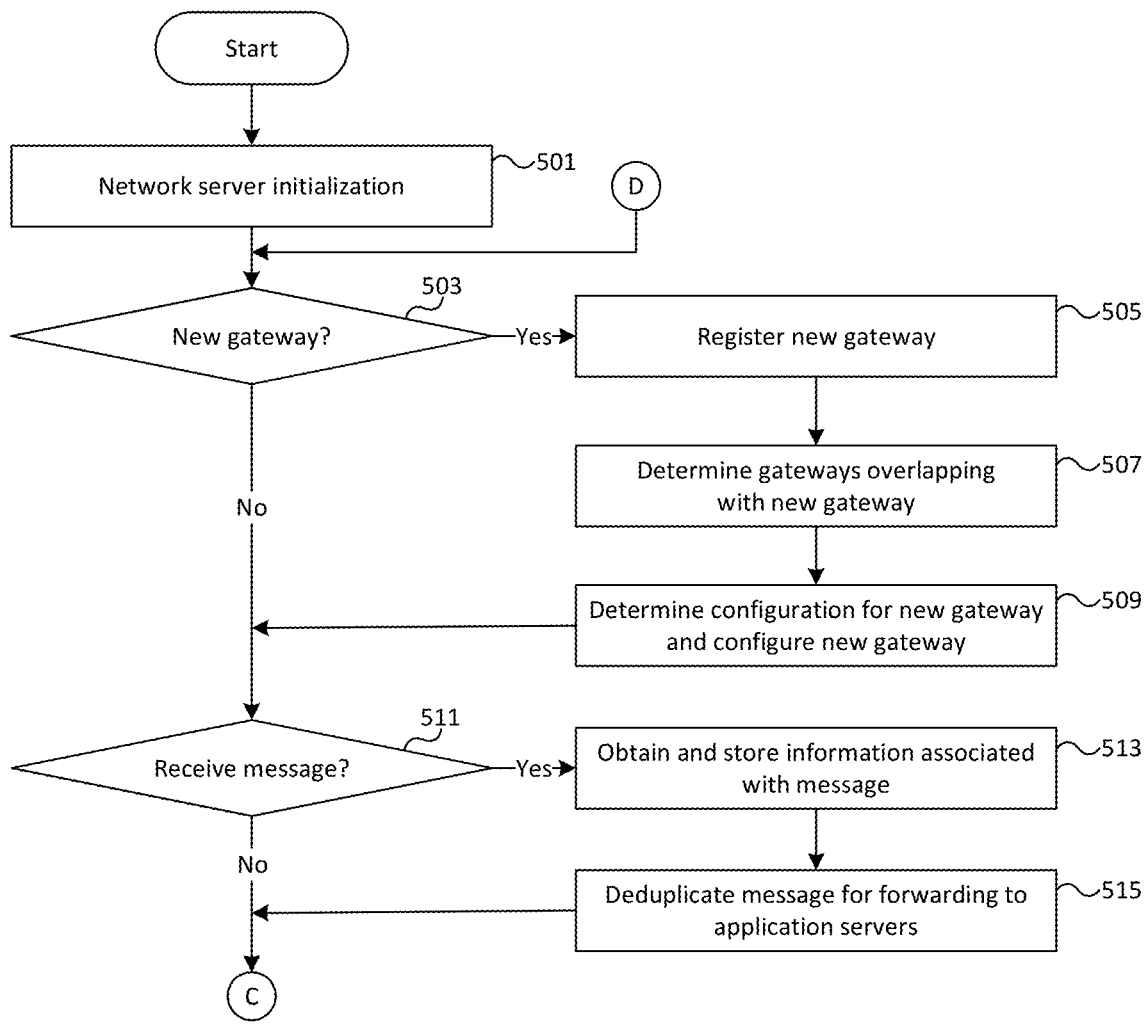
FIGS. 5A-B is a flowchart showing an example method for routing messages from user devices to a network server.
Figure 5B:
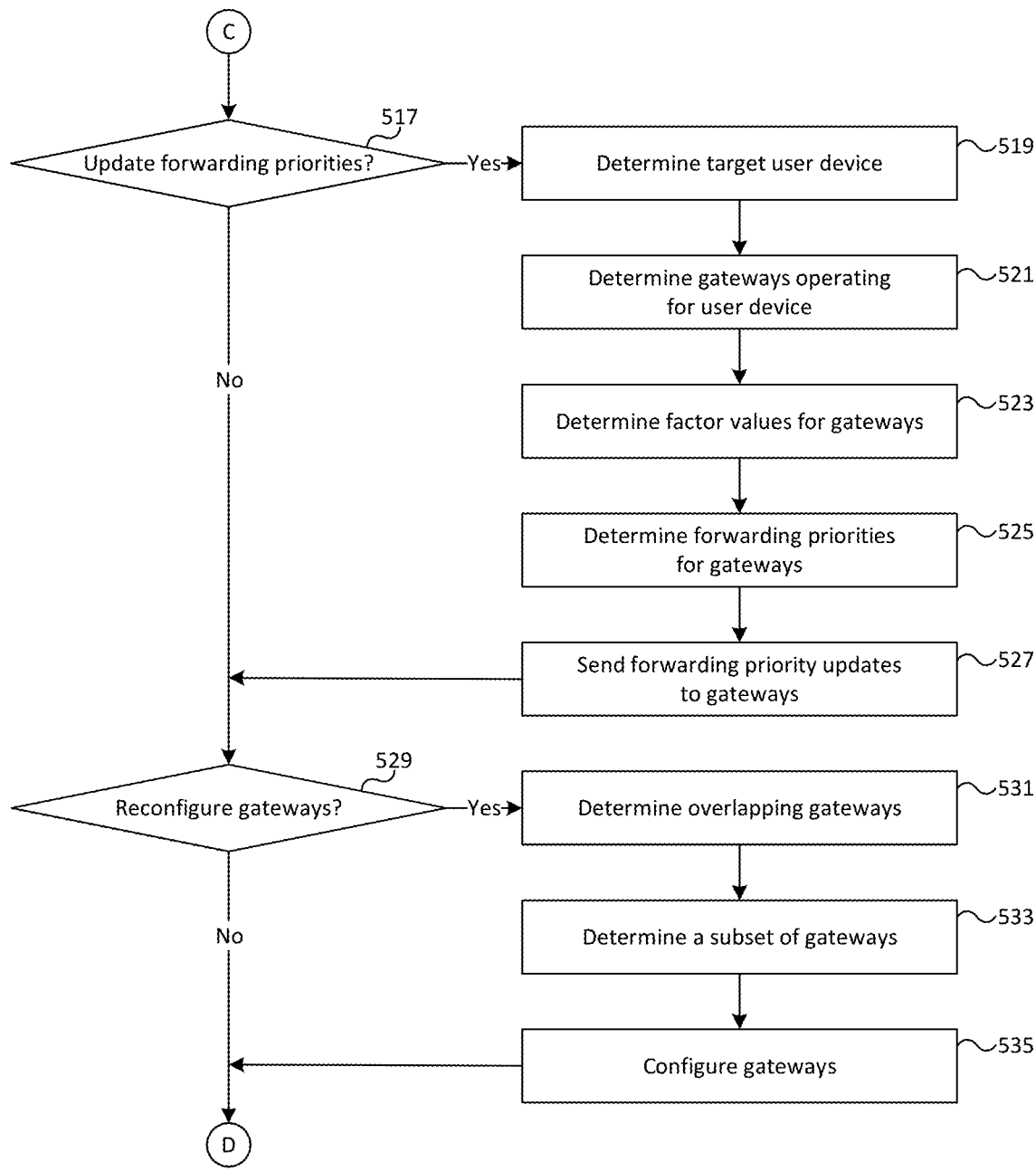

FIGS. 5A-B is a flowchart showing an example method for routing messages from user devices to a network server. The example method may be performed, for example, by the example system as discussed in connection with FIG. 3. The steps of the example method may be described as being performed by particular servers for the sake of simplicity, but the steps may be performed by any computing devices.

In step 501, the network server 305 may be initialized. The network server initialization may include the network server 305 coming online (e.g., initially connected, powered on, etc.). The network server 305 may establish communication links with the networks 309A-B, such as through a modem or other network interface device (e.g., DOCSIS, fiber, Ethernet, etc.). The network server 305 may initialize computer programs and load programmatic rules into memory (e.g., rules related to configuring gateways, processing messages, or selectively disabling gateway functions). The network server 305 may create database tables for storing various types of data. For example, the network server 305 may create a gateway information table.

The network server 305 may use the gateway information table to facilitate management of the gateways 303A-E. The gateway information table may store information corresponding to gateways communicating with the network server 305. The following shows an example gateway information table.

| Gateway identifier | Geographical location | Communication range | Operating status | Customer | Backhaul link type |
|---|---|---|---|---|---|
| GW00000001 | (38.907192, −77.036871) | 2.000 km | Standby | Customer A | fiber backhaul |
| GW00000002 | (38.896778, −77.072478) | 3.000 km | Standby | Customer B | cellular backhaul |
| GW00000003 | (38.953116, −77.456539) | 2.500 km | Active | Customer C | fiber backhaul |
| GW00000004 | (38.905141, −77.033813) | 2.100 km | Active | Customer A | cellular backhaul |

In the gateway information table, a gateway may be identified by the gateway identifier (e.g., GW00000001, GW00000002, etc.). The gateway identifier may be, for example, the gateway's IP address, MAC address, serial number, manufacturer, model, or any other type of unique identifier. Gateway information corresponding to each gateway may include the gateway's geographical location, communication range, operating status, identifier of the customer associated with (e.g., owning) the gateway, backhaul link type or bandwidth, and/or other information. A gateway's operating status may be standby or active. Additionally or alternatively, a gateway's operating status may be represented in the form of the gateway's default forwarding priority.

The data in the gateway information table may be obtained from the gateways, as discussed in connection with step 401 of FIG. 4. Additionally or alternatively, if a gateway does not supply all the information associated with the gateway, or some information in the table is otherwise missing, the network server 305 may determine the missing information based on the information already known. For example, if a gateway sends its gateway identifier (e.g., serial number and model) to the network server 305, the network server 305 may use the gateway identifier to query a database of the gateway's manufacturer. The gateway's manufacturer may supply other information related to the gateway (e.g., the gateway's communication range or backhaul link type). Based on the customer information associated with a gateway, the network server 305 may determine the geographical location of the gateway, if the network server 305 knows the locations of its customers.

After step 501, the method may proceed to step 503. In step 503, the network server 305 may determine whether a new gateway is detected. The network server 305 may detect a new gateway on the network, if the network server 305 receives an initial connection request from the new gateway. After a new gateway comes online, the new gateway may send, to the network server 305, an initial connection request to establish connection. The network server 305 may respond to the initial connection request, and have an initial handshake with the new gateway.

If the network server 305 detects a new gateway, the method may proceed to step 505. Otherwise, the method may proceed to step 511. In step 505, the network server 305 may register the new gateway (e.g., to the gateway information table). The initial connection request (and/or subsequent messages from the new gateway) may indicate all or a portion of gateway information associated with the new gateway (e.g., the new gateway's identifier, geographical location, communication range, customer information, backhaul link type or bandwidth, etc.). The network server 305 may create a new record corresponding to the new gateway in the gateway information table, and may store the received new gateway information in the new record.

After step 505, the method may proceed to step 507. In step 507, the network server 305 may determine gateways that have overlapping coverage as the new gateway. After a new gateway comes online, there may be already a number of gateways that are performing message forwarding functions in the geographical area of the new gateway. They network server 305 may configure the new gateway (and/or the existing gateways) in such a way as to avoid concentrating an excessive number of operating gateways in a small area. The network server 305 may discover overly dense deployment of gateways, and disable some or all of the functions of some of the gateways (e.g., the new gateway and/or the existing gateways).

The network server 305 may determine, based on the gateways' geographical locations, a distance between the new gateway and each of the gateways listed in the gateway information table. The network server 305 may determine a set of gateways, wherein each gateway of the set of gateways has a distance to the new gateway less than a threshold distance (e.g., 100 meters), and has an active operating status (and/or has default forwarding priority less than a threshold forwarding priority (e.g., 5)). If gateways are located close to each other, we can assume that a message sent by a user device may be received and forwarded by all of those gateways. Additionally or alternatively, the network server 305 may use the gateway's communication range (e.g., transmission range) to determine the set of overlapping gateways. For example, if the distance between the new gateway and another gateway is less than a threshold, and the difference between the new gateway and the other gateway in communication range is less than another threshold, the network server 305 may include the other gateway in the set of overlapping gateways.

After step 507, the method may proceed to step 509. In step 509, the network server 305 may determine the configuration for the new gateway and configure the new gateway accordingly. The network server 305 may configure the new gateway in various manners. The network server 305 may disable functions of the new gateway to various extents. For example, the network server 305 may instruct a gateway to change to a standby mode, which may cause the gateway to turn off the power to most of its components (e.g., the power to its transmitter, receiver, etc.), and keep the power only to an activation component that may activate the gateway after receiving an instruction from the network server 305. The network server 305 may disable functions of a gateway by instructing the gateway not to perform its message forwarding functions (e.g., by setting the gateway's default forwarding priority to be a very large number), and/or by instructing the gateway not to perform downstream transmission functions (e.g., by instructing the gateway not to transmit beacons to user devices in the Class B mode of LORAWAN). Additionally or alternatively, the network server 305 may enable the new gateway. For example, the network server 305 may instruct the new gateway to perform its message forwarding functionalities (e.g., by setting the new gateway's default forwarding priority to be one (1) or some other small number).

If the quantity of gateways in the set of overlapping gateways is less than or equal to a threshold number (e.g., 4), the network server 305 may enable the new gateway (e.g., by instructing the new gateway to perform message forwarding functions, or setting the new gateway's default forwarding priority to be one (1)). The network server 305 may determine whether the new gateway has a constrained backhaul (e.g., if the bandwidth of the backhaul link is less than a threshold bandwidth). If the new gateway has a constrained backhaul, the network server 305 may configure the new gateway's default forwarding priority to be 2 or a larger number, based on the degree of the new gateway's backhaul link constraint. The smaller backhaul link bandwidth, the higher the network server 305 may set the value of the new gateway's default forwarding priority.

If the quantity of gateways in the set of overlapping gateways are more than a threshold number (e.g., 4), the network server 305 may determine to disable functions of the new gateway (and/or the new gateway's message forwarding functionalities). For example, the network server 305 may set the new gateway to a standby mode, or set the new gateway's default forwarding priority to be a very large number. Additionally or alternatively, the network server 305 may enable the new gateway and disable functions of an existing gateway. The network server 305 may compare the backhaul link bandwidth of the new gateway with the backhaul link bandwidth of each gateway of the set of overlapping gateways. If the backhaul link bandwidth of the new gateway exceeds, by a threshold value, the backhaul link bandwidths of one or more gateways in the set, the network server 305 may enable the new gateway, and disable functions of the gateway(s), in the set, that has the lowest backhaul link bandwidths.

For example, a gateway in the set of overlapping gateways may have a constrained backhaul link (e.g., a cellular backhaul link or a backhaul link having a bandwidth below a threshold bandwidth), and the default priority for that gateway may be two (2). If the new gateway has a larger backhaul link bandwidth, the network server 305 may enable the new gateway, and disable functions of the gateway with the constrained backhaul link. Additionally or alternatively, the forwarding priority table in the replaced gateway may be copied to the new gateway before functions of the replaced gateway are disabled.

The network server 305 may send, to the new gateway (and/or the existing gateways), instructions indicating the determined configuration. The network server 305 may store the determined configuration in the gateway information table (e.g., updating the operating status in the gateway information table).

After step 509, the method may proceed to step 511. In step 511, the network server 305 may determine whether a forwarded message is received from the gateways. The message may be, for example, an IP packet. If the network server 305 determines that a message is received, the method may proceed to step 513. Otherwise, the method may proceed to step 517.

In step 513, the network server 305 may obtain information associated with the received message, and store the information in a message information table in the network server 305. For example, the network server 305 may store all or a portion of the received message in the message information table.

As discussed in connection with step 413 of FIG. 4, when a gateway forwards a message from a user device to the network server 305, the gateway may include in the outgoing message various types of information. The network server 305 may extract, from its received message, data items such as an identifier of the gateway that forwarded the message, an identifier of the user device from which the message was originated, a unit of payload data that the user device sent, the value of the frame counter counted by the user device, the signal to noise ratio associated with the message received by the gateway, and/or other information. Additionally or alternatively, the network server 305 may determine the time of arrival of the message at the network server 305.

The network server 305 may store information related to each received message. Additionally or alternatively, the network server 305 may store only information related to messages meeting a specific condition (e.g., a condition that the received message be associated with a particular user device). For example, if the network server 305 determines message information associated with certain user devices or gateways is to be used for updating forwarding priorities, the network server 305 might only store that message information.

After step 513, the method may proceed to step 515. In step 515, the network server 305 may deduplicate its received messages and relay the deduplicated messages to the application servers 307A-C. The network server 305 may deduplicate its received messages in various ways. For example, the network server 305 may perform a hash function on the received messages, and identify redundant messages that might not be relayed to the application servers 307A-C. The network server 305 may determine whether there are any duplicate messages, and from each set of duplicate messages, the network server 305 may relay one and discard the others. After step 515, the method may proceed to step 517.

In step 517, the network server 305 may determine whether to update forwarding priorities for user devices. This determination may be made based various criteria. For example, the network server 305 may determine to update the forwarding priorities for user devices periodically (e.g., every 7 days, every 30 days, etc.). Different types of user devices (e.g., mobile devices, stationary devices, etc.) may have different update periods. For example, the forwarding priorities for mobile devices may be updated more frequently than stationary devices. A user may designate, via a user interface, the type of the user device. The network server 305 may determine the type of the user device based on the user device's measured movement. For example, the network server 305 may monitor the location of the user device through the user device's geolocation functionalities, and if the location of the user device changes a threshold amount of distance within a threshold amount of time (e.g., if the average speed of the user device exceeds a threshold speed), the network server 305 may designate the user device to be a mobile user device. Additionally or alternatively, each user device may have an individualized update period.

Additionally or alternatively, the network server 305 may record the location of each user device, and may check whether the location has changed. The network server 305 may determine to update the forwarding priority for a user device if the network server 305 detects that a user device has moved beyond a threshold distance. Additionally or alternatively, the network server 305 may monitor a packet loss rate associated each user device, and if the packet loss rate associated with a user device changes by a threshold degree, the network server 305 may determine to update the forwarding priority for the user device.

Additionally or alternatively, the network server 305 may determine to update the forwarding priorities for the user devices if the network server 305 determines that its current load exceeds a threshold (e.g., 80% of the total capability of the network server 305). Additionally or alternatively, a network administrator may manually trigger the network server 305 to update the forwarding priorities. Additionally or alternatively, the network server 305 may determine to update the forwarding priority for a new user device.

If the network server 305 determines to update forwarding priorities for user devices in step 517, the method may proceed to step 519. Otherwise, the method may proceed to step 529. In step 519, the network server 305 may identify one or more user devices for which the forwarding priorities may be updated. This determination may be made based on the conditions triggering the update decision in step 517.

If the network server 305 in step 517 determines to update the forwarding priorities periodically, the network server 305 may select all or a portion of the user devices that sent messages to the network server 305. For example, the network server 305 may select all or a portion of the user devices listed in the message information table. If the network server 305 determines to update the forwarding priorities for a type of user devices (e.g., mobile devices), then all or a portion of the user devices associated that type may be selected.

If the network server 305 in step 517 determines to update forwarding priorities because of user device movement, the selected user device may be the user device that moved. If the network server 305 in step 517 determines to update forwarding priorities because of the condition of the network server 305, the selected device may be all or a portion of the user devices that communicated with the network server 305. If the network server 305 in step 517 determines to update the forwarding priorities because of a detected new user device, the selected user device may be the new user device.

After step 519, the method may proceed to step 521. In step 521, for each user device of the one or more user devices selected, the network server 305 may identify the gateways that forwarded messages for the user device. The message information table in the network server 305 may store messages that the network server 305 previous received, the user devices from which the messages were originated, and the gateways that forwarded the messages. The network server 305 may search the message information table based on the identifier of the user device, to find the gateways that forwarded messages (e.g., a particular message or a number of messages) from the user device. Additionally or alternatively, the network server 305 may determine the gateways that forwarded a substantial portion (e.g., exceeding a percentage threshold) of the messages sent by the user device, and perform the subsequent steps based on those gateways. Additionally or alternatively, to collect information, the network server 305 may instruct every gateway to temporarily forward messages from the user device. The network server 305 may in this temporary period detect which gateways forward the user device's messages (and hence which gateways are within the range of the user device).

After step 521, the method may proceed to step 523. In step 523, the network server 305 may determine, for each gateway identified in step 521, values of the factors relevant to selecting the optimal gateways for forwarding messages for a user device. The factors may include the signal to noise ratio of the user device's messages at the gateway, the time of arrival of the user device's messages at the network server 305, the distance between the gateway and the user device, and/or the gateway's backhaul link type, bandwidth, or usage rate. The factors may additionally or alternatively include packet loss rate or latency of the gateway's backhaul link. If the backhaul link of a first gateway is a highly-available fiber connection with low latency, and the backhaul link of a second gateway is a cellular connection (e.g., a 3G connection), the network server 305 may determine to use the fiber-connected gateway to forward traffic upstream in some circumstances even if the fiber-connected gateway has slightly higher packet loss rate via the link between the gateway and the user device. The network server 305 may determine the values of the factors based on the information in the message information table. And the network server 305 may store the determined values of the factors in a measured factor table. The following shows an example measured factor table.

| Gateway identifier | Signal to noise ratio | Time of arrival | Distance between gateway and user device | Gateway's backhaul link bandwidth |
|---|---|---|---|---|
| GW00000013 | 90% | +30 nanoseconds | 1.5 km | 1 Mbps (Cellular) |
| GW00004359 | 100% | −20 nanoseconds | 0.2 km | 1 Gbps (Fiber) |
| GW00000091 | 80% | −10 nanoseconds | 2.0 km | 2 Mbps (Cellular) |
| GW00000313 | 30% | +60 nanoseconds | 3.9 km | 3 Gbps (Fiber) |

After step 523, the method may proceed to step 525. In step 525, the network server 305 may determine each gateway's forwarding priority for a user device. If the factor values (or factor value changes) associated with a gateway satisfies certain thresholds, the network server 305 may set the forwarding priority associated with the gateway to be a corresponding value and/or change the forwarding priority value by a certain degree (e.g., decrease or increase the forwarding priority by one (1)). If a number of gateways are forwarding messages from a particular user device, the network server 305 may be configured to select, from the number of gateways and for forwarding messages from the user device, those that receive signals from the user device with high signal quality (e.g., satisfying a threshold quality)

and/or that have good backhaul link conditions (e.g., satisfying a threshold condition). The quality of the signal as received by a gateway may be indicated by, for example, the signal's signal to noise ratio, the signal's time of arrival, the distance between the gateway and the user device, etc. The gateway's backhaul link conditions may be indicated by, for example, the gateway's backhaul link type, bandwidth, usage rate, data usage limit, etc.

The network server 305 may assign a weight to each factor, and calculate a weighted score for each gateway. The weighted score here may be calculated in a similar manner as in step 423 and equation (1). The network server 305 may rank the gateways in terms of their weighted scores. The network server 305 may select a number (e.g., 3 or 4) of top ranking gateways. Three or four top ranking gateways may be selected, so that the selected three or four gateways may provide geolocation functionalities to the user device. Any other number of top ranking gateways may be selected. If the total number of gateways that forwarded messages for the user device is less than a threshold (e.g., 3 or 4), the network server 305 may select all of those gateways.

The selected gateways may be configured for forwarding messages for the user device (e.g., by setting the selected gateways' forwarding priorities for the user device to be one (1)). And the unselected gateways may be configured to have larger forwarding priority values for the user device (e.g., based on their rankings). For example, an unselected gateway's forwarding priority value for the user device may be configured to be larger, if the ranking of the unselected gateway is lower.

Additionally or alternatively, the network server 305 may first select gateways whose backhaul link bandwidths exceed a threshold. If the quantity of those gateways is larger than a threshold (e.g., 3 or 4), the network server 305 may rank those gateways according to the method discussed above. It may advantageous to choose gateways with larger backhaul link bandwidths first, so that the gateways with constrained backhauls might not be overloaded. Additionally or alternatively, if the network server 305 detects that a user device has moved, the network server 305 may determine the direction of the user device's movement. The network server 305 may enable a number of gateways that are located in the direction of the user device's movement.

After step 525, the method may proceed to step 527. In step 527, the network server 305 may send the determined forwarding priorities to the gateways. And the gateways may update their forwarding priority tables accordingly. After step 527, the method may proceed to step 529.

In step 529, the network server 305 may determine whether to reconfigure the gateways. The determination may be made based on various criteria (e.g., in a similar manner as in step 517). The network server 305 may determine to reconfigure the gateways on a periodic basis, based on changes of network conditions, etc. Additionally or alternatively, the network server 305 may determine to reconfigure the gateways if it detects that some gateways are turned off. If the network server 305 determines to reconfigure the gateways, the method may proceed to step 531. Otherwise, the method may go back to step 503.

In step 531, the network server 305 may determine overlapping gateways. The network server 305 makes a similar determination in step 507, where the overlapping gateways are determined based on the gateways' the geographical locations and/or communication ranges. The determination here may additionally or alternatively be made based on the data associated with the messages received by the network server 305 (e.g., the data stored in the message information table of the network server 305). The network server 305 may monitor its received messages (e.g., processing the data stored in the message information table), and identify patterns indicating overlapping gateways.

For example, if the network server 305 determines that a plurality of gateways are sending substantially similar sets of messages, the network server 305 may determine that the plurality of gateways are overlapping gateways (e.g., located in close proximity to each other). The network server 305 may determine a set of messages that were forwarded by each gateway within a period of time, and determine a degree of overlap between one set of messages and another set of messages. If the degree of overlap is larger than a threshold, the network server 305 may determine that the corresponding two gateways are overlapping gateways. The network server 305 may determine, based on the overlapping gateway pairs, a group of overlapping gateways by using the common gateways in the pairs. For example, if gateway A and gateway B are determined to be overlapping gateways, and gateway B and gateways C are determined to be overlapping gateways, the network server 305 may determine that gateway A, gateway B, and gateway C are a group of overlapping gateways.

Additionally or alternatively, the network server 305 may determine overlapping gateways based on determining whether a particular set of messages is present in the set of messages associated with a gateway, and whether the particular set of messages is a substantial portion (e.g., exceeding a threshold percentage) of the set of messages associated with the gateway. For example, the network server 305 may determine that gateway A and gateway B are overlapping gateways, and they have a set of overlapping messages. The network server 305 may determine whether the set of overlapping messages are present in a message set associated with gateway C, and whether the set of overlapping messages amounts to a substantial portion of the message set associated with gateway C. If the answers to both these two questions are yes, the network server 305 may determine that gateway C is an overlapping gateway with gateway A and gateway B.

Additionally or alternatively, the network server 305 may determine overlapping gateways based on the relations between the user devices and the gateways. If each gateway of a plurality of gateways forwarded messages sent by a plurality of user devices, it is likely that the plurality of gateways are overlapping gateways, unless the plurality of user devices are located close to each other. The network server 305 may determine gateways that forward messages for a user device in a similar manner as in step 521. For example, the network server 305 may determine gateways that forward messages for user device A, and gateways that forward messages for user device B. The network server 305 may determine the common gateways that forward messages for both user device A and user device B. The network server 305 may additionally or alternatively determine whether the common gateways also forward messages for other user devices. If the number of user devices (e.g., user device A, user device B, and the other user devices) exceeds a threshold, the network server 305 may determine that the common gateways are overlapping gateways. The network server 305 may additionally or alternatively consider the distance between the user devices. The distance between the user devices may be made based on the geographical locations of the user devices, which may be determined by the geolocation functionalities supported by the network (e.g., the Global Positioning System, etc.). For example, if the distance between user device A and user device B is larger than a threshold, the network server 305 may determine that the common gateways are overlapping gateways. Additionally or alternatively, the network server 305 may determine that the common gateways are overlapping gateways if the area of the shape created by connecting the outermost points represented by the geographical locations of the user devices is larger than a threshold (e.g., 10 square kilometer).

After step 531, the method may proceed to step 533. In step 533, the network server 305 may determine a subset of the determined overlapping gateways, in a similar manner as in step 509. For example, the network server 305 may select the subset based on the backhaul link bandwidths of the overlapping gateways. The subset may include a number (e.g., 3 or 4) of gateways that have the highest backhaul link bandwidths.

After step 533, the method may proceed to step 535. In step 535, the network server 305 may determine to enable the subset of gateways and disable functions of the unselected gateways as determined in step 531. The network server 305 may send configuration instructions to the gateways in a similar manner as in step 509.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a first computing device and from a plurality of gateways, a plurality of first messages, wherein each message of the plurality of first messages is intended for a second computing device;
   determining, by the first computing device, that each message of the plurality of first messages is duplicative;
   selecting, by the first computing device and based on determining that each message of the plurality of first messages is duplicative, one message of the plurality of first messages; and
   sending, by the first computing device and to the second computing device, a second message containing a portion of the one message.

2. The method of claim 1, wherein each message of the plurality of first messages is sent by a same user device.

3. The method of claim 1, wherein each gateway of the plurality of gateways is within a wireless communication range of a same user device that sent each message of the plurality of first messages.

4. The method of claim 1, wherein determining that each message of the plurality of first messages is duplicative comprises determining that each message is duplicative based on a value of a frame counter indicated in a header of each message.

5. The method of claim 1, wherein determining that each message of the plurality of first messages is duplicative comprises determining that each message is duplicative based on a payload of each message.

6. The method of claim 1, wherein determining that each message of the plurality of first messages is duplicative comprises determining that each message is duplicative based on a same user device identifier contained in each message.

7. The method of claim 1, wherein determining that each message of the plurality of first messages is duplicative comprises performing a hash function on at least a portion of each message.

8. The method of claim 1, wherein selecting the one message comprises selecting an earliest received message of the plurality of first messages.

9. The method of claim 1, wherein the plurality of first messages are received using a first communication protocol and wherein the second message is sent using a second communication protocol.

10. The method of claim 1, wherein the first computing device comprises a network server and the second computing device comprises an application server.

11. The method of claim 1, wherein determining that each message of the plurality of first messages is duplicative comprises determining that each message includes a same value of a frame counter indicated in a header of each message.

12. The method of claim 1, wherein determining that each message of the plurality of first messages is duplicative comprises determining that each message includes an incremental value of a frame counter, indicated in a header of each message, relative to an earlier received message of the plurality.

13. The method of claim 1, wherein the portion of the one message comprises a payload of the one message and a user device identifier of a user device that sent the one message.

14. A method comprising:
   receiving, by a gateway and from a same user device, a plurality of first messages;
   determining, by the gateway, that each message of the plurality of first messages is duplicative; and
   based on determining that a quantity of the plurality of first messages has satisfied a minimum threshold and based on determining that each message of the plurality of first messages is duplicative, sending, by the gateway and to a network server, a second message comprising a portion of one message of the plurality of first messages.

15. The method of claim 14, wherein determining that each message of the plurality of first messages is duplicative comprises determining that each message of the plurality of first messages contains a same frame counter value.

16. The method of claim 14, wherein determining that each message of the plurality of first messages is duplicative comprises determining that each message of the plurality of first messages contains a same payload.

17. The method of claim 14, wherein determining that that each message of the plurality of first messages is duplicative comprises comparing a first value of a frame counter, contained in an earlier received message of the plurality of first messages, to a second value of a frame counter, contained in a later received message of the plurality of first messages.

18. The method of claim 14, further comprising including, in the second message, an identifier of the gateway and a signal to noise ratio associated with receiving the one message.

19. The method of claim 14, further comprising selecting an earliest received message of the plurality of first messages as the one message.

20. The method of claim 14, further comprising:
   receiving, by the gateway and from the network server, a confirmation that the second message was received by the network server; and
   sending, by the gateway and the same user device, the confirmation.

* * * * *

UNITED STATES PATENT AND TRADEMARK OFFICE
CERTIFICATE OF CORRECTION

| | | |
|---|---|---|
| PATENT NO. | : 12,003,395 B2 | Page 1 of 1 |
| APPLICATION NO. | : 18/151240 | |
| DATED | : June 4, 2024 | |
| INVENTOR(S) | : Gilson et al. | |

It is certified that error appears in the above-identified patent and that said Letters Patent is hereby corrected as shown below:

In the Claims

Column 32, Line 42:
In Claim 16, delete "that that" and insert --that--

Column 32, Line 46:
In Claim 17, delete "that that" and insert --that--

Signed and Sealed this
Sixteenth Day of September, 2025

Coke Morgan Stewart
*Acting Director of the United States Patent and Trademark Office*